Figure 3:
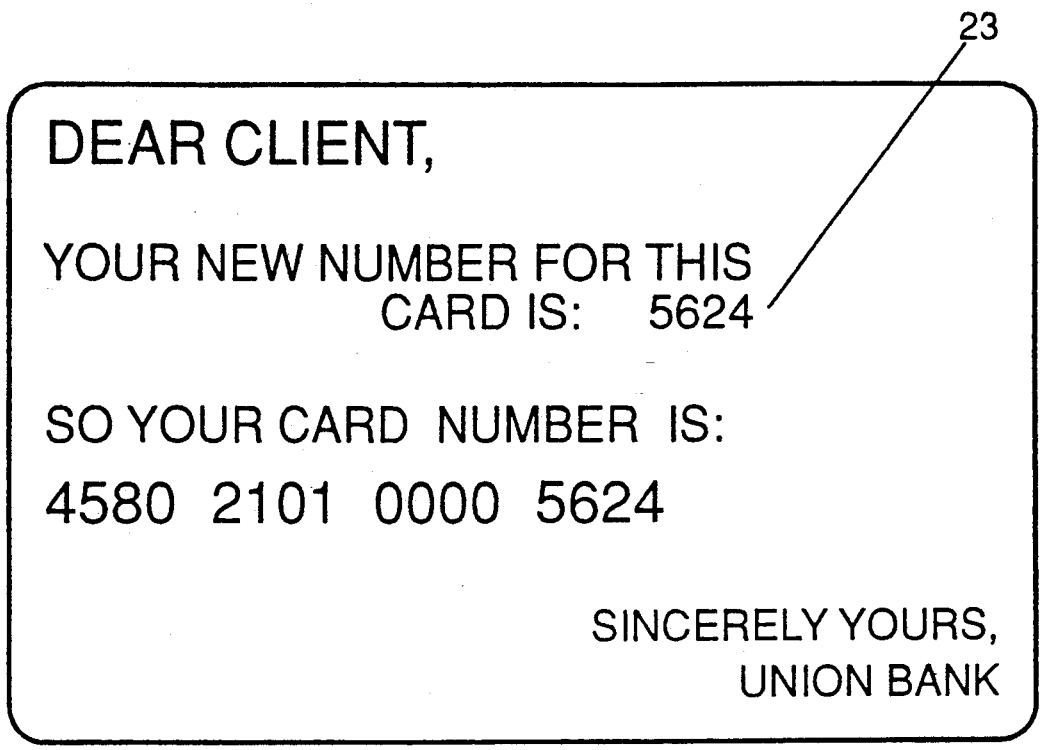

United States Patent [19]
Shomron

[11] Patent Number: 5,259,649
[45] Date of Patent: Nov. 9, 1993

[54] CREDIT CARD

[76] Inventor: Gur Shomron, 23 Eilat Street, Holon, Israel

[21] Appl. No.: 718,416

[22] Filed: Jun. 24, 1991

[30] Foreign Application Priority Data

Jun. 22, 1990 [IL] Israel .................................. 94848

[51] Int. Cl.$^5$ ............................................. B42D 15/00
[52] U.S. Cl. ..................................... 283/114; 283/904
[58] Field of Search .............................. 283/114, 904

[56] References Cited

U.S. PATENT DOCUMENTS 4,824,144  4/1989  Tasma ........................... 283/114 X
4,947,027  8/1990  Golightly ....................... 382/904 X

FOREIGN PATENT DOCUMENTS 2854862  6/1980  Fed. Rep. of Germany ...... 283/904

Primary Examiner—Paul A. Bell
Attorney, Agent, or Firm—Keck, Mahin & Cate

[57] ABSTRACT

Credit cards intended to eliminate or at least greatly reduce misuse by unauthorized persons. The card bears in addition to the correct identification number a number of further digits or letters, so that a person obtaining such card in an unauthorized manner will not be able to identify the correct number. The rightful owner has only to remember which of the numbers or letters is not part of the correct identification code. A card may be provided with a number of identification codes, encircled by a variety of different geometrical shapes, thus the owner has only to remember the shape in order to identify his correct access code.

6 Claims, 2 Drawing Sheets

UNION BANK     VISA®

11 — 4580 2101 0000 5624

GOOD THRU
LAST DAY OF   06/93

069-000832/61
GUR SHOMRON

FIG. 1

UNION BANK     VISA®

22 — 
7901   2606   3944   5624   0655
8817   *3031*   4426   *1550*   4401
1116   0201   BA16   Q21Z   *C300*

21 — 4580 2101 0000 ____

GOOD THRU
LAST DAY OF   06/93

069-000832/61
GUR SHOMRON

FIG. 2

CREDIT CARD

FIELD OF THE INVENTION

Credit and phone cards, the latter especially for international phone cards, is very wide spread. The wide use of such cards is accompanied by various forms of misuse, and it is an object of the present invention to prevent to a large extent some of such misuses.

BACKGROUND OF THE INVENTION

Credit cards and also phone cards are used internationally on an ever-increasing scale. These are used instead of "hard money" and even instead of checks or traveller checks.

There exits a widespread use of credit cards for orders by telephone, where the owner of the card indicates his name and credit number. Furthermore, very frequently one of the copies of a voucher is lost or thrown away. Anyone who finds such a copy can use the credit card number for ordering by phone, and such misuse causes enormous losses to credit-card companies. The possibility to use such information for orders by phone is apt to cause serious losses due to the fact that the card owner and the company will generally become aware of the misuse only after a prolonged time, when the next list of expenses is submitted to the card holder.

Nowadays, a number of approaches is being used trying to overcome this problem. One of these is the recording on the card of only part of the required number, the card owner being required to remember a further number, generally of three or four digits, which is required for the use of the card. Such numbers are frequently forgotten or lost. Furthermore, this method is in use mainly for drawing money from a bancomat. Another technique is that the customer is required to apply his signature which has to match that on the card. This is effective only with direct purchases and prevents to a certain extent misuses if a card is lost.

Another approach is the use, by credit card companies, of monitoring very frequent use of cards. This fails to distinguish between a business man and a thief making such frequent uses.

SUMMARY OF THE INVENTION

The invention is intended to overcome a large extent the damage caused by the misuse of credit cards and of phone cards. The novel credit card is characterized in that it bears in addition to the clearly discernible partial number, further numbers or combinations of numbers with other signs, only one of these being the correct one for supplementing the apparent one during actual use. It is easy for the owner of a card to remember which of the additional groups is the number he has to use with the "disclosed" partial number. It is also possible to provide two or more such additional groups, and the customer can be instructed to use a sequence of the two additional further numbers. In view of this, when the card is stolen or lost, no unauthorized person can make use of it for phone orders which cause the largest losses, as he will not be able to ascertain which of the plurality of additional number groups is the correct one. The card can be programmed, so that if more than one attempt is made to use an incorrect number, it will be immediately detected, and if used in a bancomat—"swallowed".

Figure 4:
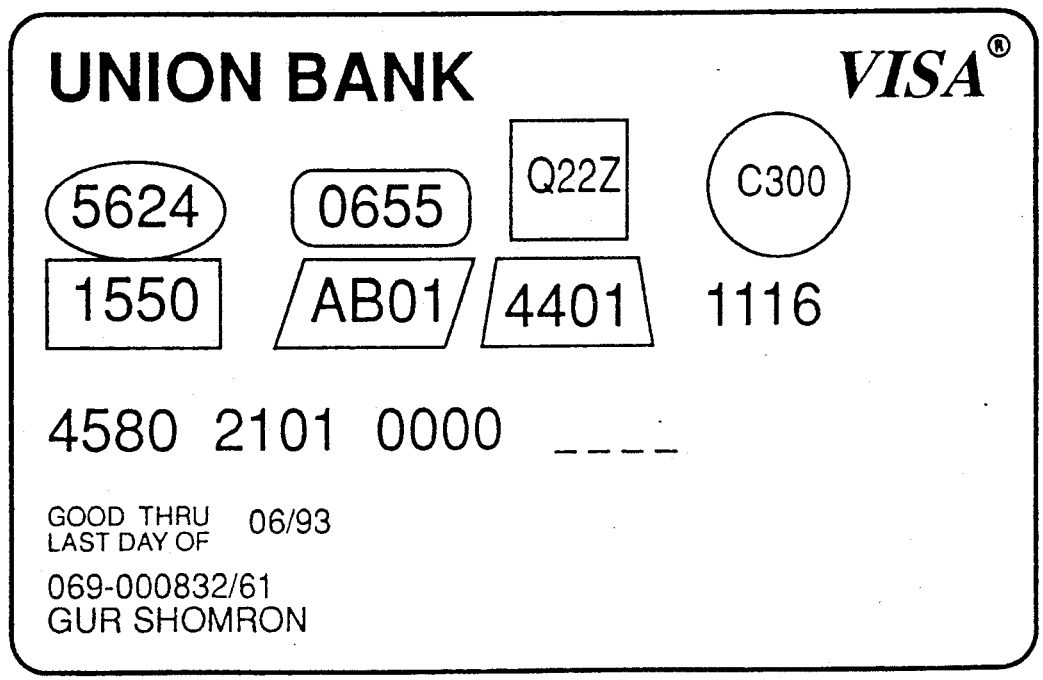

The invention is illustrated with reference to the enclosed schematical drawings, in which:

FIG. 1 is a plan view of a credit card of the prior art;
FIG. 2 is a plan view of a card according to the invention;
FIG. 3 illustrates a possible card or notice sent by the bank to the customer informing him on the additional number which must be used.
FIG. 4 is a plan view of another credit card according to the invention.

According to a further embodiment of the invention the card is provided with a partial number defining for the company the identity of the card-holder and his card-number. In addition to this, one of the groups of digits and/or letters defines the customer-code, and thus even if the copy of the bill comes into unauthorized hands, such illegal holder will not be able to use the card for purchases by phone due to lack of information as to the code-sequence. The issuer of the card who receives the sales-record is of course able to identify and approve the hidden code, which will be located in different locations on different cards. The code can be any desired sequence of letters or numbers, in identical or different script and/or size, thus facilitating for the card-owner, the identification and recollection of the code-sequence amongst the numerous sequences on the card.

According to yet a further embodiment the various groups of numbers are printed by the same print, but surrounded by different geometrical shapes, such as a square, rectangle, ellipse, circle, trapeze etc, and in this case the owner of the card needs only to remember the correct shape which provides the recollection of the correct code encircled by such shape.

The credit card shown in FIG. 1 is a conventional one, which gives the full identifying number of the card holder, 11. For bankomat use the owner has to remember his code number.

FIG. 2 is a card according to the invention.

In this card there is provided only part of the identifying number in one sequence, 21, and the card further contains a plurality of further numbers 22, which are in this case four-digit numbers. Only one of these is the correct one, 562. When using the card is a normal manner for the purchase of any goods, the carbon copy and copy will contain all the groups 22, including group 23. The computer of the card service will be able to identify this code number 23, but anyone who tries to misuse a copy of the card will not be able to make any purchases by phone. The same applies to phone cards.

The same code number can serve as the code for use with a bankomat, or any of the other groups.

The groups 22 can be surrounded by different geometric boundaries, and in such case the owner has only to remember the geometric shape and not the location of the correct code sequence. FIG. 4 illustrates a further credit card according to the invention in which the groups of numbers and/or letters are surrounded by different geometric shapes. In nonlimiting examples, group 41 is surrounded by an oval shape, group 42 is surrounded by a trapezium shape, groups 43 and 44 are surrounded by rectangles, group 45 is surrounded by an irregular 4-sided figure and group 46 is surrounded by a hexagon. Group 22 is not surrounded by a geometric border.

FIG. 3 is a possible information card which indicates only the code number or sequence and ought to be kept separately by the card owner.

I claim:

1. A credit-card comprising as identification of an authorized card-holder a sequence selected from numbers and letters, wherein in addition to an authorizing sequence the card bears a plurality of indicia imprinted on a substrate selected from a sequence of numbers and letter, one of which is an authorizing code to be used by a user for purchases, said groups further comprising different geometrical shapes one of said geometrical shapes identifying the authorizing code, which pattern cannot be identified by an unauthorized user.

2. A credit card according to claim 1 where the groups are sequences selected from numbers and letters.

3. A credit card according to claim 1 comprising more than one correct code, amongst a plurality of incorrect codes.

4. A credit card as claimed in claim 1, where the groups comprise distinctive patterns including encircling said groups by different geometrical shapes, whereby the card-owner has to remember only the shape in order to find the correct code.

5. A credit card according to claim 1 where at least one of the code groups represents a secret number for use in a bank machine.

6. A credit-card according to claim 1 being a card for making phone calls wherein the purchases are purchases of phone calls and at least one of the indicia sequence is an authorizing code for making phone calls.

* * * * *